(12) United States Patent
Ray (10) Patent No.: US 12,355,615 B2
(45) Date of Patent: Jul. 8, 2025

(54) MANAGEMENT OF SERVICE AVAILABILITY FOR MULTI-ACCESS EDGE COMPUTING

(71) Applicant: INTERNATIONAL BUSINESS MACHINES CORPORATION, Armonk, NY (US)

(72) Inventor: Kaustabha Ray, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 8 days.

(21) Appl. No.: 18/306,726

(22) Filed: Apr. 25, 2023

(65) Prior Publication Data

US 2024/0364584 A1    Oct. 31, 2024

(51) Int. Cl.
*H04L 41/0681* (2022.01)
*H04L 41/142* (2022.01)
*H04L 43/0817* (2022.01)

(52) U.S. Cl.
CPC ........ *H04L 41/0681* (2013.01); *H04L 41/142* (2013.01); *H04L 43/0817* (2013.01)

(58) Field of Classification Search
CPC ............... H04L 41/0681; H04L 41/142; H04L 43/0817
See application file for complete search history.

(56) References Cited

U.S. PATENT DOCUMENTS

| | | | |
|---|---|---|---|
| 10,185,617 B2 * | 1/2019 | Konireddygari | .... H04L 41/0893 |
| 10,326,766 B2 | 6/2019 | Egner et al. | |
| 10,778,779 B2 | 9/2020 | Vrzic et al. | |
| 11,388,073 B1 * | 7/2022 | Chraim | .................. H04L 43/045 |
| 2013/0155843 A1 * | 6/2013 | Berg | ..................... H04W 40/02 370/221 |
| 2021/0127241 A1 | 4/2021 | Moubayed et al. | |
| 2022/0014963 A1 | 1/2022 | Yeh et al. | |
| 2022/0360485 A1 * | 11/2022 | Lim | ..................... H04L 41/065 |

FOREIGN PATENT DOCUMENTS

| | | |
|---|---|---|
| CN | 109347739 B | 6/2021 |
| KR | 10-20220078837 A | 6/2022 |

OTHER PUBLICATIONS

2023Prioritized Fault Recovery Strategies for Multi-Access Edge Computing, Kaustabha Ray and Ansuman Banerjee (Year: 2023).*
H. Liu, et al., "A Fast Algorithm for Energy-Saving Offloading With Reliability and Latency Requirements in Multi-Access Edge Computing", IEEE Access, , Dec. 23, 2019, 11 pp.
A. Ghorab, et al., "SDN-based Service Discovery and Assignment Framework to Preserve Service Availability in Telco-based Multi-Access Edge Computing", IEEE, 2022 IEEE 6th International Conference on Fog and Edge Computing (ICFEC), 2022, 5 pp.

* cited by examiner

*Primary Examiner* — Anh Nguyen
(74) *Attorney, Agent, or Firm* — KONRAD, RAYNES, DAVDA & VICTOR LLP; Rabindranath Dutta (57) ABSTRACT

Provided are a method, system, and computer program product in which operations are performed to model edge servers and service reinitialization rates via continuous time probabilistic models. Context-aware edge server failure classification into critical or non-critical failure is performed by analyzing a context comprising one or more services, failure rates associated with edge servers, and service reinitialization rates.

20 Claims, 7 Drawing Sheets

Analyzing failure scenarios

- 402 What is the long-run probability that the number of reinitializations is greater than 10?

- 404 What is the probability that the number of active pods for a service drops below minimum specified number within 10 minutes?

- 406 What is the probability of going from number of deployed pods from 3 to 4 within 2 minutes?

- 408 What is the probability that the system is below a specified minimum number of pods deployed until time T?

MANAGEMENT OF SERVICE AVAILABILITY FOR MULTI-ACCESS EDGE COMPUTING

BACKGROUND

Embodiments relate to a method, system, and computer program product for the management of service availability for multi-access edge computing.

Multi-Access Edge Computing (MEC) is used as an application service provisioning paradigm for low-latency access to services in a cellular telephony network. In MEC paradigms, service providers deploy their application services on MEC servers adjacent to mobile base stations. Computationally intensive operations from Internet-of-Things (IoT) devices may be directed to nearby MEC servers as the IoT devices move around, in order to reduce latency in comparison to accessing services located at traditional cloud data centers.

Stochastic modeling presents data and predicts outcomes that account for certain levels of unpredictability or randomness. A Markov chain is a stochastic model (also referred to as a probabilistic model) that describes a sequence of possible events in which the probability of each event depends only on the state attained in the previous event. Markov chains are widely used in modeling many different types of scenarios.

US20220014963A1 discusses mechanisms for utilizing artificial intelligence (AI) and/or machine learning (ML) techniques for performing multi-access traffic management. CN109347739B discusses mechanisms for resource allocation and access point selection in a multi-access edge computing environment. KR1020220078837A discusses mechanisms for providing real-time service ranking adjustment based on multi-access edge computing.

SUMMARY

Provided are a method, system, and computer program product in which operations are performed to model edge servers and service reinitialization rates via continuous time probabilistic models. Context-aware edge server failure classification into critical or non-critical failure is performed by analyzing a context comprising one or more services, failure rates associated with the edge servers, and service reinitialization rates. As a result, performance improvements are made in a muti-access edge computing environment.

In additional embodiments, the continuous time probabilistic models comprise Continuous Time Markov Chains (CTMC). Operations include encoding a failure scenario context with single or multiple services and different server failure rates under consideration using Continuous Stochastic Logic (CSL) specification. As a result, failure rates are used in operations that improve performance in a multi-access edge computing environment.

In yet additional embodiments, operations are performed to utilize the CTMC models and the CSL specification with a CTMC to classify failure criticality level. As a result, failure criticality levels are used in operations that improve performance in a multi-access edge computing environment.

In further embodiments, a comparative mechanism for evaluating availability due to failures is provided. As a result, system availability is improved in a multi-access edge computing environment.

In certain embodiments, recommendations are made of failure criticality of different geo-located edge sites. As a result, improvements based on failure criticality levels mare made at a plurality of edge sites.

In further embodiments, operations are performed to analyze an impact of failures and service reinitialization on service availability. As a result, both failures and service reinitialization rates are used to improve service availability in a multi-access edge computing environment.

In certain embodiments, failure scenarios are analyzed by metrics in CSL, and recommendations are made for service criticality. As a result, recommendations that improve system performance in a multi-access edge computing environment are provided.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made. Certain embodiments are directed towards a method, system, and computer program product for performing edge server failure analysis and service reinitialization on service availability for multi-access edge computing using Continuous Time Markov Chains (CTMC). A CTMC may be a continuous stochastic process in which, for each state, the process may change state according to an exponential random variable and then move to a different state as specified by the probabilities of a stochastic matrix. More specifically the embodiments are directed towards:

(1) Performing context-aware edge server failure classification into critical or non-critical failure by analyzing the context involving a single service or multiple services, failure rates associated with servers, and service reinitialization rates as specified by a system administrator;

(2) Plugging into existing orchestration platforms for the server failure criticality recommendation depending on the context of critical and non-critical failures;

(3) Modeling edge servers and service reinitialization rates as CTMC;

(4) Encoding the failure scenario context with single or multiple services and different server failure rates under consideration using Continuous Stochastic Logic (CSL) specification;
(5) Encoding failure criticality level as a probability parameter specified by the system administrator; and
(6) Utilizing the CTMC models and the CSL specification with a CTMC analyzer to classify failure criticality level.

Certain embodiments relate to the management of service availability for multi-access edge computing to improve the services provided by computational devices in a plurality of edge computing environment sites, based on determination of criticality of failure rates of edge servers. As a result, performance improvements are made in the operations of computing systems and mobile networks.

Figure 1:
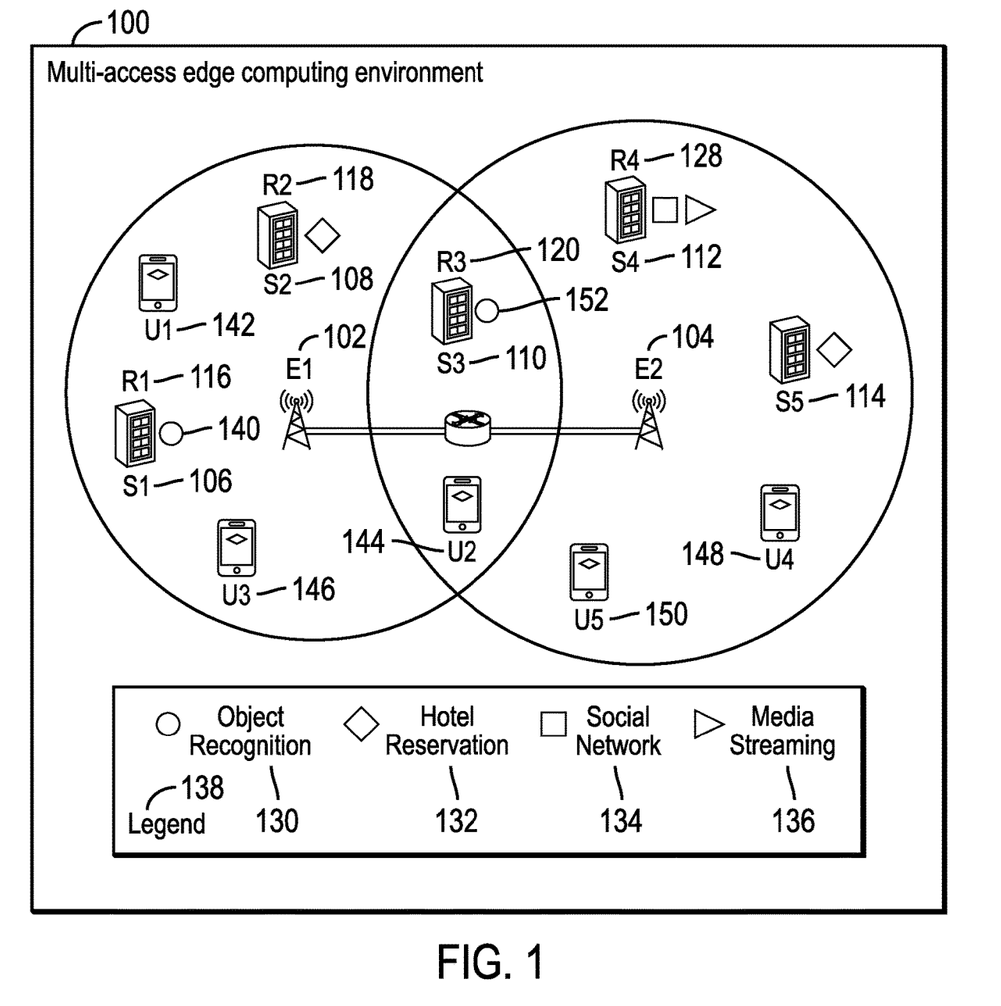
FIG. 1 illustrates a block diagram of a multi-access edge computing environment, in accordance with certain embodiments.

FIG. 1 illustrates a block diagram 100 of a multi-access edge computing environment 100, in accordance with certain embodiments.

Multiple edge sites comprising a first edge site E1 102 and a second edge site E2 104 are shown. Each edge site is comprised of a plurality of servers, where the servers are also referred to as edge servers. For example, the first edge site E1 102 is comprised of three servers S1, S2, S3 (shown via reference numerals 106, 108, 110) and the second edge site E2 104 is comprised of a server S4 and a server S5 (shown via reference numerals 112, 114). The edge servers have failure rates shown via R1, R2, R3, R4 (shown via reference numerals 116, 118, 120, 124). For example, the edge server S1 106 has a failure rate R1 116, the edge server S2 102 has a failure rate R2 118, and so on. The failure rate of an edge server may be defined as the mean time to failure for the edge server, i.e., the mean time after which the edge server fails. Furthermore, each server has an analogous repair rate, which is the mean time to repair the server.

Services are deployed on the edge servers. Exemplary services such as object recognition service 130, hotel reservation service 132, social network service 134, and media streaming service 136 are shown via the legend 138 at the bottom of FIG. 1. The service deployed on each server is shown. For example, in FIG. 1, server S1 106 has object recognition service 140 shown as running on the server S1. Devices U1, U2, U3, U4, U5 are shown in FIG. 1 (reference numerals 142, 144, 146, 148, 150). The devices U1, U2, U3, U4, U5 (reference numerals 142, 144, 146, 148, 150) may comprise user equipment such as mobile phones that request services deployed on the edge servers S1. S2, S3, S4, S5 (reference numerals 106, 108, 110, 112, 114).

Orchestration platforms such as Kubernetes® (Kubernetes is a trademark of "The Linux Foundation") are used in certain embodiments. An orchestration platform includes one or more applications that may manage workloads and services in one or more edge sites. There is an orchestration platform for every edge site. Each orchestration platform includes a load balancer and executes on at least one edge server. The orchestration platform for an edge site executes in a server in the edge site, where the server may be a centralized failure recommendation policy controller.

When a failure of an edge server occurs, a service that was running on the failed edge server has to be reinitialized by the orchestration platform on another edge server either in the same edge site or on a different edge site (for example, pod reinitialization may have to be performed where a pod is an instance of a service).

For example, in one embodiment shown in FIG. 1, two instances of the object recognition service (shown via reference numerals 140, 152) are shown running on server S1 106, and server S3 110. The orchestration platform performs a load balancing to distribute workload between the instances of the object recognition services 140, 152. However, if server S1 106 fails, then the object recognition service 140 is no longer able to provide services, and another instance of an object recognition service may have to be deployed on another edge server, such as server S5 114, and then the load balancing for object recognition may take place between server S3 110 and the server S5 114.

Each service has a reinitialization time, where the reinitialization time is the time needed by the service to become fully operational to service requests from the devices U1, U2, U3, U4, U5 (reference numerals 142, 144, 146, 148, 150). Certain embodiments determine the impact of failures and reinitialization on service availability. Availability means that the service is accessible to users with a desired Quality of Experience (QoE). In certain embodiments, servers with variable failure rates are determined. The choice of reinitialization server may have a critical impact on the Quality of Service QoS) provided by a service. The QoS affects the QoE of the users.

Reinitialization time is the time to start the container corresponding to a service. Some edge server failures may be critical failures and some edge server failures may be non-critical failures. Some failures which leave only a single instance of a service running may be a critical failure if the service is essential for users. For example, a single operational instance of the object recognition service on the failure of a server may be regarded as critical failure, if multiple instances of the object recognition service are needed for real time autonomous vehicle navigation to ensure safety and provide a good QoS. However, a failure of an edge server that leaves only a single instance of a hotel reservation service running may be classified as a non-critical failure, as the hotel reservation service while slow would not cause safety issues. Certain embodiments try to classify failures on edge servers based on the services, the nature of the services deployed, and the failure rates of the edge servers.

The overall architecture of the service placement synthesis setup is as follows. MEC users invoke service requests via a wireless link with the base station. Each edge site is associated with a centralized failure recommendation policy controller which monitors the state of the edge servers and invokes the modeling and analysis system in the event of a failure. The modeling and analysis system constructs CTMC models of edge servers and the containers corresponding to the application services within the edge site. The CTMC models for servers are instantiated using their failure and repair rates and the CTMC models for containers are instantiated with their initialization rates. The failure scenario to be analyzed is represented by the Continuous Stochastic Logic (CSL) specifications.

In certain embodiments, servers in FIG. 1 may comprise any suitable computational device including those presently known in the art, such as, a personal computer, a workstation, a mainframe, a hand held computer, a palm top computer, a head mounted computer, a telephony device, a network appliance, a blade computer, a processing device, a controller, etc. The elements shown in FIG. 1 may be in any suitable network, such as, a storage area network, a wide area network, the Internet, an intranet, etc., or in a cloud computing environment.

Figure 2:
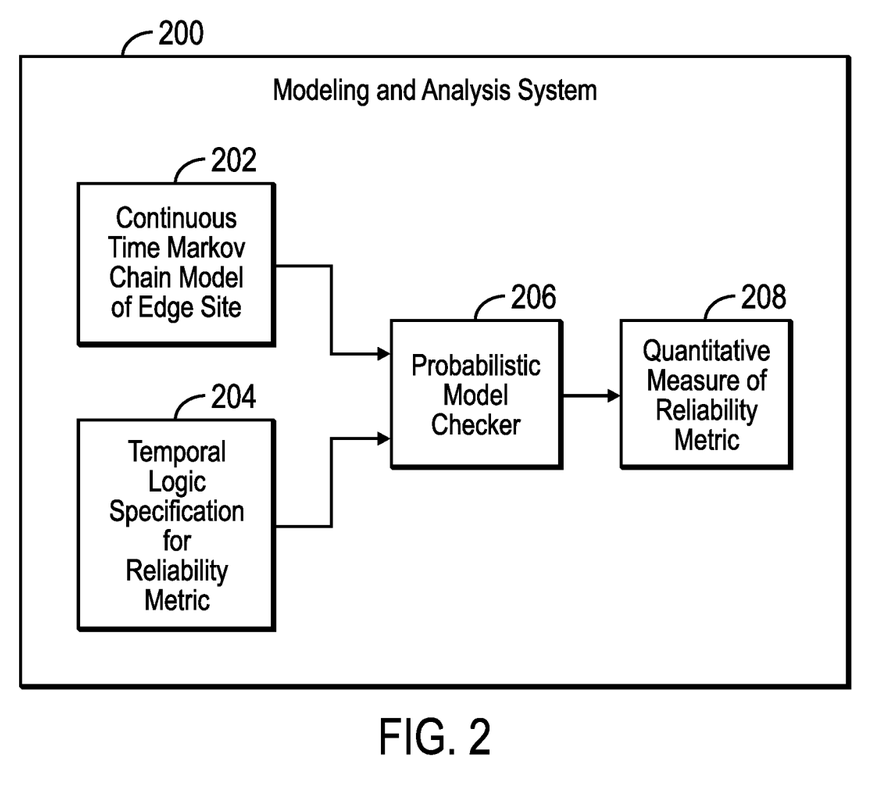
FIG. 2 illustrates a block diagram of a modeling and analysis system, in accordance with certain embodiments.

FIG. 2 illustrates a block diagram 200 of a modeling and analysis system, in accordance with certain embodiments. In existing mechanisms, the load balancer is at a particular edge site cluster (an example of a load balancer is a Kubernetes® load balancer). Certain embodiments provide operations for quantifying the impact of failures on load balancing and can serve as a recommender.

Continuous Time Markov Chain (CTMC) model-based analysis of edge sites is performed (reference numeral 202). Certain embodiments construct a model of each edge site. Each edge site is characterized by parameters governing server failure rates (e.g., mean time to failure). Certain embodiments specify the failure scenario to be analyzed.

The load balancer may in certain embodiments ensure that three pods are always deployed for a critical service. Recommendations are made for criticality of failure.

The CTMC models 202 along with the CSL specification 204 that is a temporal logic specification for mean time to failures of edge servers are provided as input to a Probabilistic Model Checker 206. The output of the Probabilistic Model Checker 206 is a quantitative measure of a reliability metric 208. The orchestration platform recommends the failure criticality level by comparing the quantitative measure 208 with a predetermined threshold value. For example, if the quantitative measure 208 is less than or equal to the predetermined threshold then a failure is a non-critical failure, whereas if the quantitative measure 208 is greater than the predetermined threshold than the failure is a critical failure.

Figure 3:
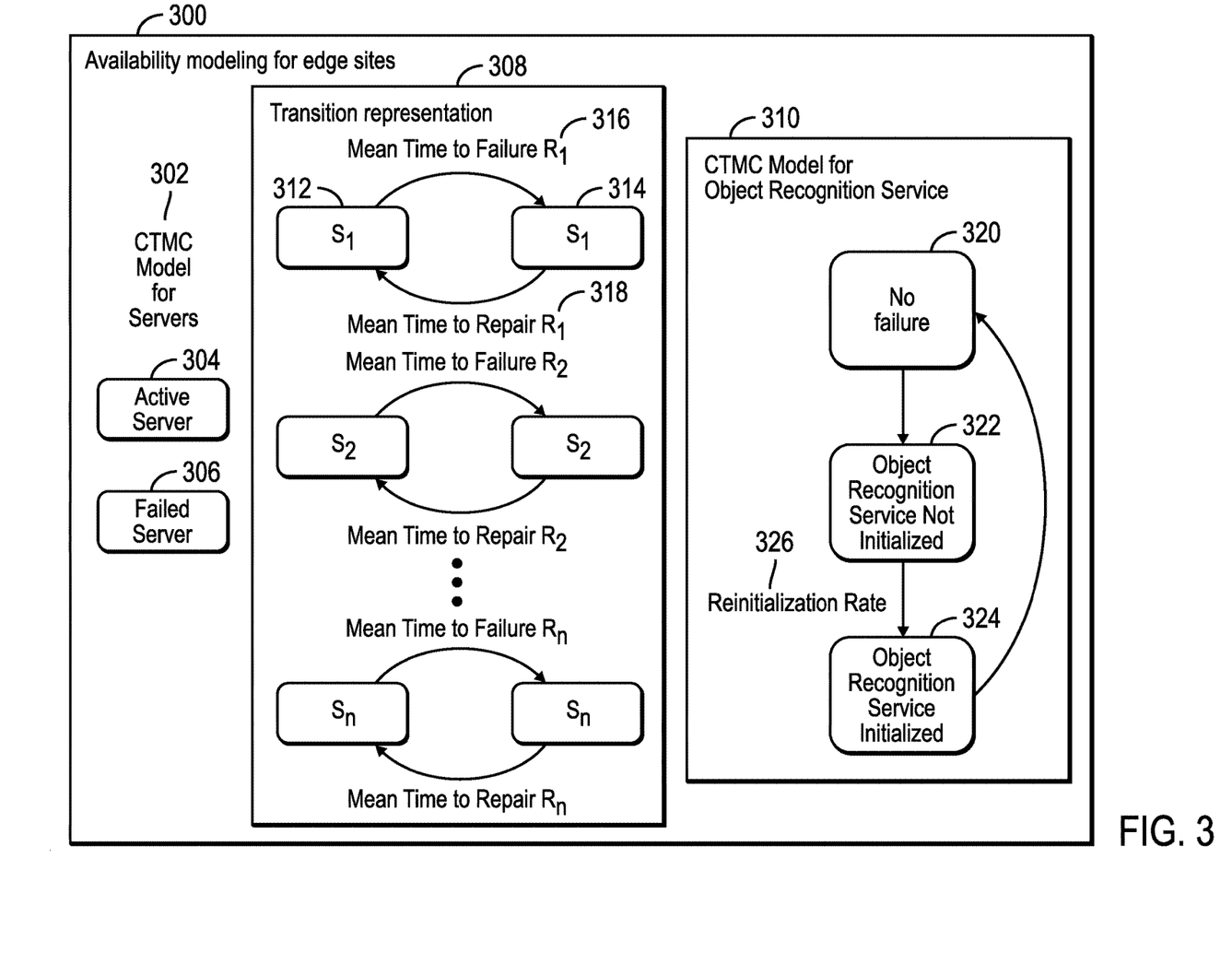
FIG. 3 illustrates a block diagram that shows the availability modeling for edge sites, in accordance with certain additional embodiments.

FIG. 3 illustrates a block diagram 300 that shows the availability modeling for edge sites, in accordance with certain additional embodiments.

In certain embodiments, Continuous Time Markov Chain (CTMC) Models 302 are maintained. For servers, the failure rates and repair rates are maintained. For service, the service reinitialization rate is maintained. A unified model of servers and services using composition is generated and each edge site is analyzed independently.

Each server within the edge site is represented by a CTMC with two states as depicted in FIG. 3 corresponding to active state for a server (reference numeral 304) and failure state for a server (reference numeral 306). For example, transition representation 308 for n servers are shown. The active state of the first server is shown via reference numeral 312 and the failed state of the first server is shown via reference numeral 314. The mean time to failure 316 and the mean time to repair 318 to move between the active and failed states are also represented.

Upon server failure, for each server within the particular edge site where the failure occurred, a CTMC model is instantiated. For the faulty server, the state of the CTMC is instantiated to the failure state, while for the other servers with the edge site, the CTMC models are instantiated to the active state.

For transition representation 308, for each MEC server CTMC, the transitions from the active states to the failure states are instantiated with the failure rate of the servers. Similarly, the transitions from the failure state to the active state are instantiated with the repair rate of the servers. The transitions are thus executed in accordance with the exponentially distributed random variables represented by the failure rates and repair rates respectively. The exponentially distributed random variables describe the time between events that occur at a constant rate and independently of each other and are widely utilized to model failure and repair rates. The transition representation 308 is a Markov model for the edge servers.

The CTMC model 310 for application service containers such as an object recognition service is depicted. It is a Markov model for a service. For each container, the CTMC model comprises three states 320, 322, 324 representing the life cycle of an application service container such an object recognition service. When a server failure occurs, for each application service, the initial state of the CTMC model of container is instantiated with the remaining number of container instances deployed in the edge site. For example, in FIG. 1 when edge server S1 106 fails, the CTMC model for the object recognition service is initialized with the number of container instances deployed as 1 since only one other instance is deployed within edge site E1 102 is on edge server S3 110. The reinitialization rate of the service 306 is also modeled.

Figure 4:
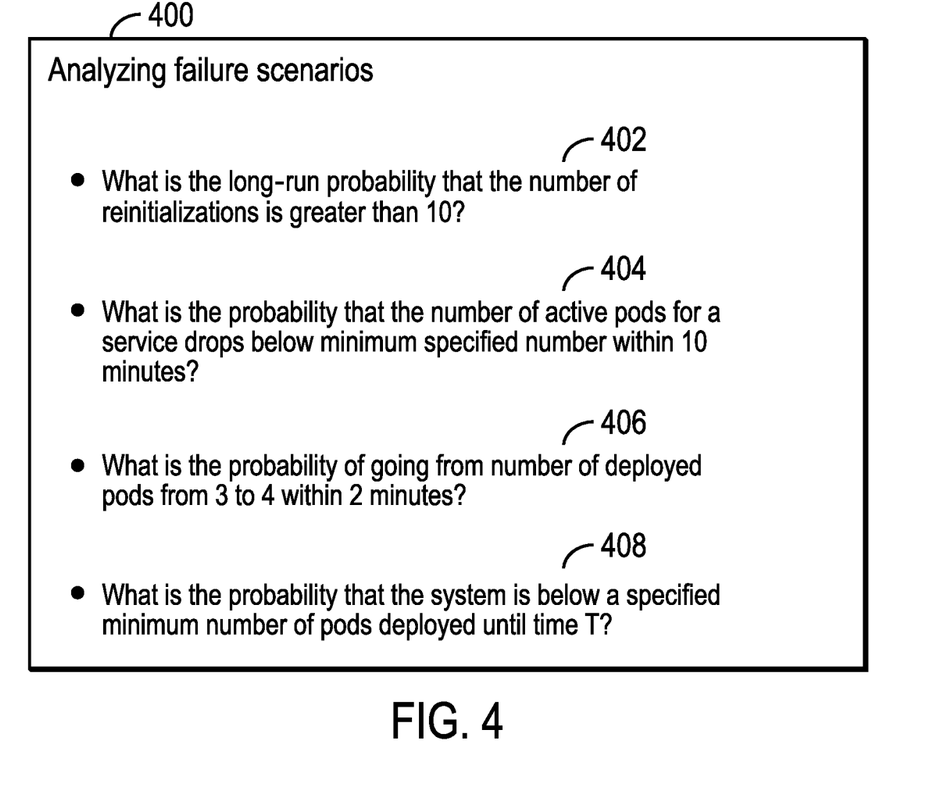
FIG. 4 illustrates a block diagram that shows the analyzing of failure scenarios, in accordance with certain additional embodiments.

FIG. 4 illustrates a block diagram 400 for analyzing failure scenarios, in accordance with certain additional embodiments.

Analyzing failure scenarios include determining in one embodiment at least the following:

(1) What is the long-run probability that the number of reinitializations is greater than 10? (reference numeral 402);

(2) What is the probability that the number of active pods (a pod is an instance of service) for a service drops below minimum specified number within 10 minutes? (reference numeral 404);

(3) What is the probability of going from number of deployed pods from 3 to 4 within 2 minutes? (reference numeral 406);

(4) What is the probability that the system is below a specified minimum number of pods deployed until time T? (reference numeral 408).

Many variations of course are possible with other questions for analyzing failure scenarios.

Figure 5:
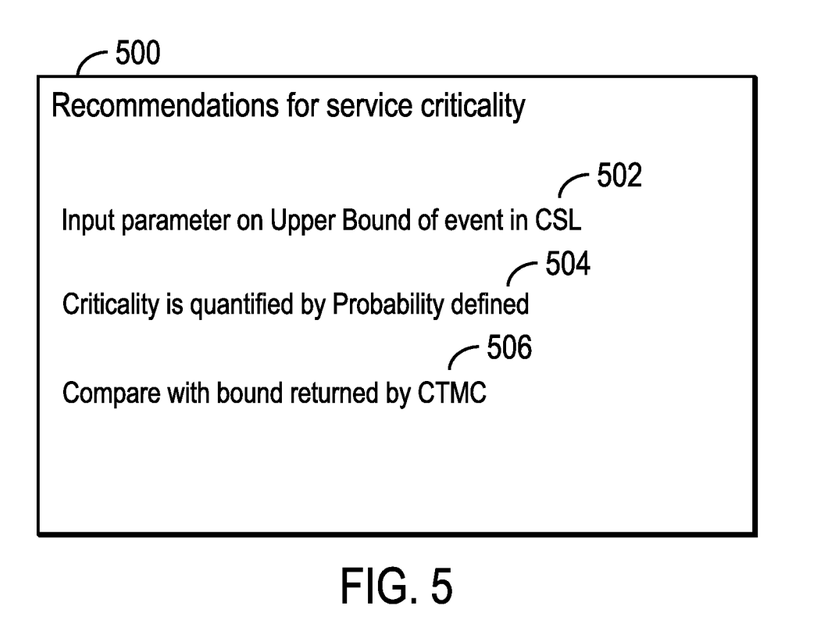
FIG. 5 illustrates a block diagram that shows recommendations for service criticality, in accordance with certain additional embodiments.

FIG. 5 illustrates a block diagram 500 that shows recommendations for service criticality, in accordance with certain additional embodiments.

Input parameter on upper bound of event in CSL is defined (reference numeral 502). A criticality is quantified by a defined probability (reference numeral 504). A comparison is made with a bound returned by CTMC (reference numeral 506) as was shown in FIG. 2. In this way, a determination is made as to whether a failure is a critical failure or a non-critical failure. The orchestrater platform takes appropriate action based on the criticality of the failure. The Markov chain model for services is used to augment the Markov chain model for edge servers to arrive that determination of criticality of the failure of servers.

Figure 6:
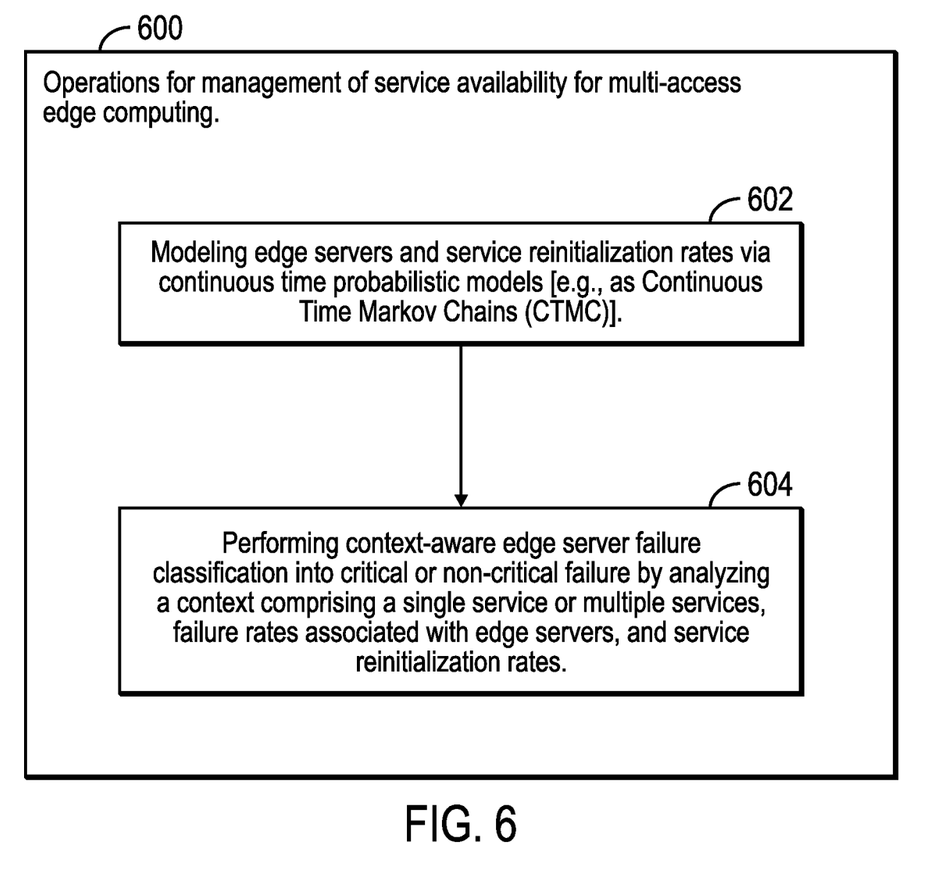
FIG. 6 illustrates a flowchart for management of service availability for multi-access edge computing.

FIG. 6 illustrates a flowchart 600 for management of service availability for multi-access edge computing. The operations shown in FIG. 6 may be performed in a computational device in which the orchestration platform is present.

Control starts at block 602 in which operations are performed to model edge servers and service reinitialization rates as continuous time probabilistic models [e.g., as Continuous Time Markov Chains (CTMC)]. Context-aware edge server failure classification into critical or non-critical failure is performed (at block 604) by analyzing a context comprising a single service or multiple services, failure rates associated with edge servers, and service reinitialization rates. The parameters for context, failure rates, and service reinitialization rates may be specified by a system administrator.

Therefore, FIGS. 1-6 illustrate embodiments for management of service availability for multi-access edge computing to improve the services provided by computational devices in a plurality of edge computing environment sites, based at least on determination of criticality of failure rates of edge servers.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

Figure 7:
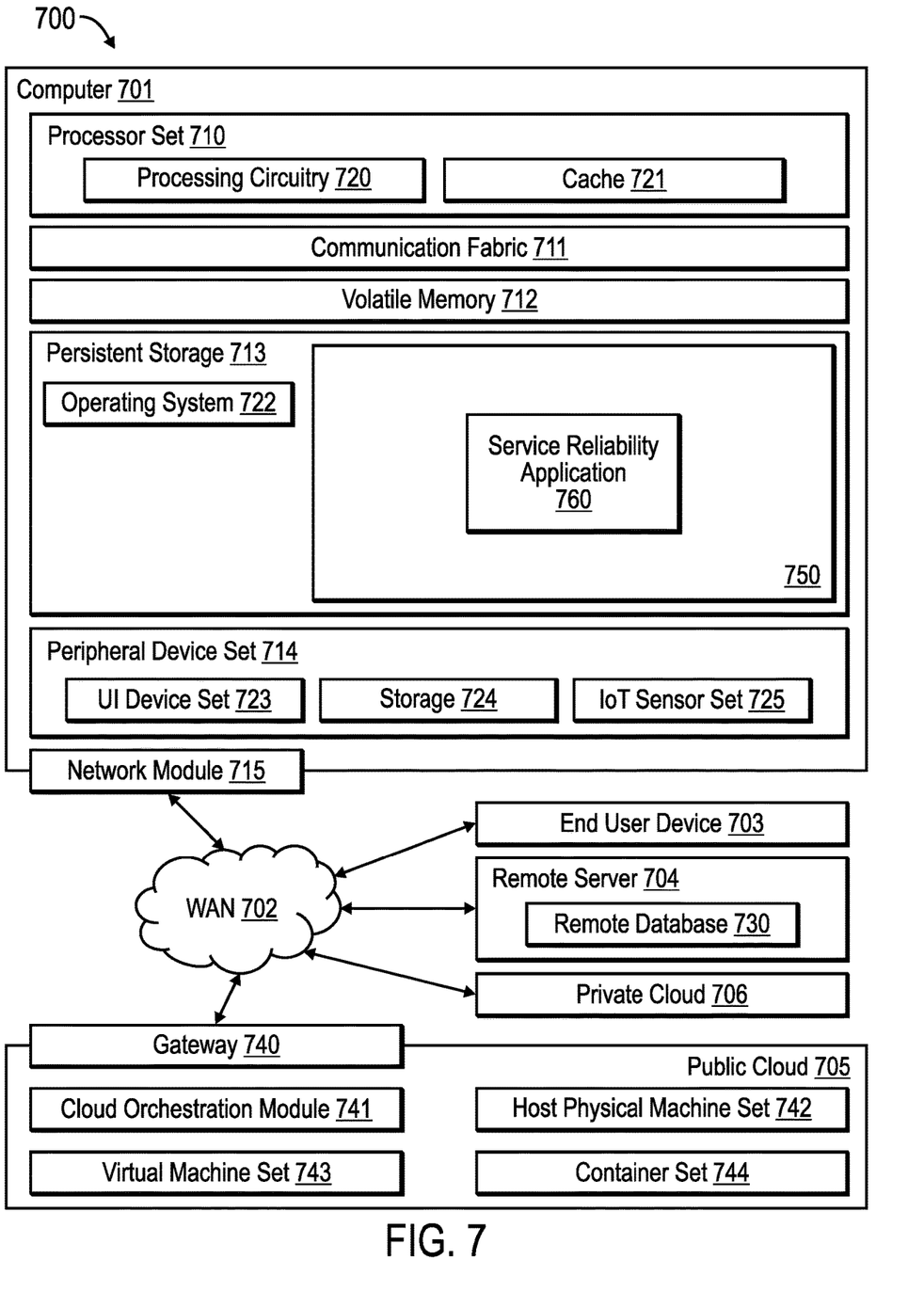
FIG. 7 illustrates a computing environment in which certain components may be implemented, in accordance with certain embodiments.

In FIG. 7, computing environment 700 contains an example of an environment for the execution of at least some of the computer code (block 750) involved in performing the operations of a service reliability application 760 that performs operations shown in FIGS. 1-6.

In addition to block 750, computing environment 700 includes, for example, computer 701, wide area network (WAN) 702, end user device (EUD) 703, remote server 704, public cloud 705, and private cloud 706. In this embodiment, computer 701 includes processor set 710 (including processing circuitry 720 and cache 721), communication fabric 711, volatile memory 712, persistent storage 713 (including operating system 722 and block 750, as identified above), peripheral device set 714 (including user interface (UI) device set 723, storage 724, and Internet of Things (IoT) sensor set 725), and network module 715. Remote server 704 includes remote database 730. Public cloud 705 includes gateway 740, cloud orchestration module 741, host physical machine set 742, virtual machine set 743, and container set 744.

COMPUTER 701 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 730. As is well understood in the art of computer technology, and depending upon the technology, performance of a computer-implemented method may be distributed among multiple computers and/or between multiple locations. On the other hand, in this presentation of computing environment 700, detailed discussion is focused on a single computer, specifically computer 701, to keep the presentation as simple as possible computer 701 may be located in a cloud, even though it is not shown in a cloud in FIG. 7. On the other hand, computer 701 is not required to be in a cloud except to any extent as may be affirmatively indicated.

PROCESSOR SET 710 includes one, or more, computer processors of any type now known or to be developed in the future. Processing circuitry 720 may be distributed over multiple packages, for example, multiple, coordinated integrated circuit chips. Processing circuitry 720 may implement multiple processor threads and/or multiple processor cores. Cache 721 is memory that is located in the processor chip package(s) and is typically used for data or code that should be available for rapid access by the threads or cores running on processor set 710. Cache memories are typically organized into multiple levels depending upon relative proximity to the processing circuitry. Alternatively, some, or all, of the cache for the processor set may be located "off chip." In some computing environments, processor set 710 may be designed for working with qubits and performing quantum computing.

Computer readable program instructions are typically loaded onto computer 701 to cause a series of operational steps to be performed by processor set 710 of computer 701 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 721 and the other storage media discussed below. The program instructions, and associated data, are accessed by processor set 710 to control and direct performance of the inventive methods. In computing environment 700, at least some of the instructions for performing the inventive methods may be stored in block 750 in persistent storage 713.

COMMUNICATION FABRIC 711 is the signal conduction path that allows the various components of computer 701 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 712 is any type of volatile memory now known or to be developed in the future. Examples include dynamic type random access memory (RAM) or static type RAM. Typically, volatile memory 712 is characterized by random access, but this is not required unless affirmatively indicated. In computer 701, the volatile memory 712 is located in a single package and is internal to computer 701, but, alternatively or additionally, the volatile memory may be distributed over multiple packages and/or located externally with respect to computer 701.

PERSISTENT STORAGE 713 is any form of non-volatile storage for computers that is now known or to be developed in the future. The non-volatility of this storage means that the stored data is maintained regardless of whether power is being supplied to computer 701 and/or directly to persistent storage 713. Persistent storage 713 may be a read only memory (ROM), but typically at least a portion of the persistent storage allows writing of data, deletion of data and re-writing of data. Some familiar forms of persistent storage include magnetic disks and solid-state storage devices. Operating system 722 may take several forms, such as various known proprietary operating systems or open-source Portable Operating System Interface-type operating systems that employ a kernel. The code included in block 750 typically includes at least some of the computer code involved in performing the inventive methods.

PERIPHERAL DEVICE SET 714 includes the set of peripheral devices of computer 701. Data communication connections between the peripheral devices and the other components of computer 701 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 723 may include components such as a display screen, speaker, microphone, wearable devices (such as goggles and smart watches), keyboard, mouse, printer, touchpad, game controllers, and haptic devices. Storage 724 is external storage, such as an external hard drive, or insertable storage, such as an SD card. Storage 724 may be persistent and/or volatile. In some embodiments, storage 724 may take the form of a quantum computing storage device for storing data in the form of qubits. In embodiments where computer 701 is required to have a large amount of storage (for example, where computer 701 locally stores and manages a large database) then this storage may be provided by peripheral storage devices designed for storing very large amounts of data, such as a storage area network (SAN) that is shared by multiple, geographically distributed computers. I/O T sensor set 725 is made up of sensors that can be used in Internet of Things applications. For example, one sensor may be a thermometer and another sensor may be a motion detector.

NETWORK MODULE 715 is the collection of computer software, hardware, and firmware that allows computer 701 to communicate with other computers through WAN 702. Network module 715 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 715 are performed on the same physical hardware device. In other embodiments (for example, embodiments that utilize software-defined networking (SDN)), the control functions and the forwarding functions of network module 715 are performed on physically separate devices, such that the control functions manage several different network hardware devices. Computer readable program instructions for performing the inventive methods can typically be downloaded to computer 701 from an external computer or external storage device through a network adapter card or network interface included in network module 715.

WAN 702 is any wide area network (for example, the internet) capable of communicating computer data over non-local distances by any technology for communicating computer data, now known or to be developed in the future. In some embodiments, the WAN 702 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 703 is any computer system that is used and controlled by an end user (for example, a customer of an enterprise that operates computer 701), and may take any of the forms discussed above in connection with computer 701. EUD 703 typically receives helpful and useful data from the operations of computer 701. For example, in a hypothetical case where computer 701 is designed to provide a recommendation to an end user, this recommendation would typically be communicated from network module 715 of computer 701 through WAN 702 to EUD 703. In this way, EUD 703 can display, or otherwise present, the recommendation to an end user. In some embodiments, EUD 703 may be a client device, such as thin client, heavy client, mainframe computer, desktop computer and so on.

REMOTE SERVER 704 is any computer system that serves at least some data and/or functionality to computer 701. Remote server 704 may be controlled and used by the same entity that operates computer 701. Remote server 704 represents the machine(s) that collect and store helpful and useful data for use by other computers, such as computer 701. For example, in a hypothetical case where computer 701 is designed and programmed to provide a recommendation based on historical data, then this historical data may be provided to computer 701 from remote database 730 of remote server 704.

PUBLIC CLOUD 705 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 705 is performed by the computer hardware and/or software of cloud orchestration module 741. The computing resources provided by public cloud 705 are typically implemented by virtual computing environments that run on various computers making up the computers of host physical machine set 742, which is the universe of physical computers in and/or available to public cloud 705. The virtual computing environments (VCEs) typically take the form of virtual machines from virtual machine set 743 and/or containers from container set 744. It is understood that these VCEs may be stored as images and may be transferred among and between the various physical machine hosts, either as images or after instantiation of the VCE. Cloud orchestration module 741 manages the transfer and storage of images, deploys new instantiations of VCEs and manages active instantiations of VCE deployments.

Gateway 740 is the collection of computer software, hardware, and firmware that allows public cloud 705 to communicate through WAN 702.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 706 is similar to public cloud 705, except that the computing resources are only available for use by a single enterprise. While private cloud 706 is depicted as being in communication with WAN 702, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 705 and private cloud 706 are both part of a larger hybrid cloud.

The letter designators, such as i, is used to designate a number of instances of an element may indicate a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

Several examples will now be provided to further clarify various aspects of the present disclosure:

Example 1: A method comprising modeling edge servers and service reinitialization rates via continuous time probabilistic models, and performing context-aware edge server failure classification into critical or non-critical failure by analyzing a context comprising one or more services, failure rates associated with the edge servers, and service reinitialization rates.

Example 2: The limitations of Example 1, wherein the continuous time probabilistic models comprise Continuous Time Markov Chains (CTMC), the method further comprising encoding a failure scenario context with single or multiple services and different server failure rates under consideration using Continuous Stochastic Logic (CSL) specification.

Example 3: The limitations of any of Examples 1-2, the method further comprising utilizing the CTMC models and the CSL specification with a CTMC to classify failure criticality level.

Example 4: The limitations of any of Examples 1-3, wherein a comparative mechanism for evaluating availability due to failures is provided.

Example 5: The limitations of any of Examples 1-4, wherein recommendations are made of failure criticality of different geo-located edge sites.

Example 6: The limitations of any of Examples 1-5, the method further comprising analyzing an impact of failures and service reinitialization on service availability.

Example 7: The limitations of any of Examples 1-6, wherein failure scenarios are analyzed by metrics in CSL, and recommendations are made for service criticality.

Example 8: A system comprising a memory and a processor coupled to the memory, wherein the processor performs a method according to any of Examples 1-7.

Example 9: A computer program product comprising a computer readable storage medium having computer readable program code embodied therewith, wherein the computer readable program code when executed is configured to perform a method according to any of Examples 1-7.

What is claimed is:

1. A method comprising:
   modeling edge servers and service reinitialization rates via continuous time probabilistic models; and
   performing context-aware edge server failure classification into critical or non-critical failure by analyzing a context comprising one or more services, failure rates associated with the edge servers, and service reinitialization rates, wherein failure scenarios are analyzed by:
   determining a probability associated with a drop in a number of active pods below a minimum specified number within a predetermined interval of time;
   determining a probability of a rate of increase in a number of deployed pods; and
   determining a probability that a number of reinitializations is greater than a predetermined number, wherein a pod is an instance of a service.

2. The method of claim 1, wherein the continuous time probabilistic models comprise Continuous Time Markov Chains (CTMC), the method further comprising: encoding a failure scenario context with single or multiple services and different server failure rates under consideration using Continuous Stochastic Logic (CSL) specification.

3. The method of claim 2, the method further comprising: utilizing CTMC models and the CSL specification with a CTMC to classify failure criticality level.

4. The method of claim 1, wherein a comparative mechanism for evaluating availability due to failures is provided.

5. The method of claim 4, wherein recommendations are made of failure criticality of different geo-located edge sites.

6. The method of claim 1, the method further comprising: analyzing an impact of failures and service reinitialization on service availability.

7. The method of claim 1, wherein failure scenarios are analyzed by metrics in CSL, and recommendations are made for service criticality.

8. A system, comprising:
   a memory; and
   a processor coupled to the memory, wherein the processor performs operations, the operations comprising:
   modeling edge servers and service reinitialization rates via continuous time probabilistic models; and
   performing context-aware edge server failure classification into critical or non-critical failure by analyzing a context comprising one or more services, failure rates associated with the edge servers, and service reinitialization rates, wherein failure scenarios are analyzed by:
   determining a probability associated with a drop in a number of active pods below a minimum specified number within a predetermined interval of time;
   determining a probability of a rate of increase in a number of deployed pods; and
   determining a probability that a number of reinitializations is greater than a predetermined number, wherein a pod is an instance of a service.

9. The system of claim 8, wherein the continuous time probabilistic models comprise Continuous Time Markov Chains (CTMC), the operations further comprising: encoding a failure scenario context with single or multiple services and different server failure rates under consideration using Continuous Stochastic Logic (CSL) specification.

10. The system of claim 9, the operations further comprising: utilizing CTMC models and the CSL specification with a CTMC to classify failure criticality level.

11. The system of claim 8, wherein a comparative mechanism for evaluating availability due to failures is provided.

12. The system of claim 11, wherein recommendations are made of failure criticality of different geo-located edge sites.

13. The system of claim 8, the operations further comprising: analyzing an impact of failures and service reinitialization on service availability.

14. The system of claim 8, wherein failure scenarios are analyzed by metrics in CSL, and recommendations are made for service criticality.

15. A computer program product, the computer program product comprising a computer readable storage medium having computer readable program code embodied therewith, the computer readable program code when executed is configured to perform operations, the operations comprising:
   modeling edge servers and service reinitialization rates via continuous time probabilistic models; and
   performing context-aware edge server failure classification into critical or non-critical failure by analyzing a context comprising one or more services, failure rates associated with the edge servers, and service reinitialization rates, wherein failure scenarios are analyzed by:
   determining a probability associated with a drop in a number of active pods below a minimum specified number within a predetermined interval of time;
   determining a probability of a rate of increase in a number of deployed pods; and
   determining a probability that a number of reinitializations is greater than a predetermined number, wherein a pod is an instance of a service.

16. The computer program product of claim 15, wherein the continuous time probabilistic models comprise Continuous Time Markov Chains (CTMC), the operations further comprising:
   encoding a failure scenario context with single or multiple services and different server failure rates under consideration using Continuous Stochastic Logic (CSL) specification.

17. The computer program product of claim 16, the operations further comprising:
   utilizing CTMC models and the CSL specification with a CTMC to classify failure criticality level.

18. The computer program product of claim 15, wherein a comparative mechanism for evaluating availability due to failures is provided.

19. The computer program product of claim 18, wherein recommendations are made of failure criticality of different geo-located edge sites.

20. The computer program product of claim 15, the operations further comprising:
   analyzing an impact of failures and service reinitialization on service availability.

* * * * *